(12) United States Patent
Larsen et al.

(10) Patent No.: US 8,235,634 B2
(45) Date of Patent: Aug. 7, 2012

(54) CAGE NUT ASSEMBLY

(75) Inventors: Lars R. Larsen, Old Lyme, CT (US);
Stewart A. Levesque, Scotland, CT (US)

(73) Assignee: Ortronics, Inc., New London, CT (US)

( * ) Notice: Subject to any disclaimer, the term of this patent is extended or adjusted under 35 U.S.C. 154(b) by 78 days.

(21) Appl. No.: 12/509,592

(22) Filed: Jul. 27, 2009

(65) Prior Publication Data

US 2011/0020091 A1    Jan. 27, 2011

(51) Int. Cl.
*F16B 39/284*    (2006.01)
(52) U.S. Cl. .......................... 411/112; 411/966
(58) Field of Classification Search .................. 411/85, 411/88, 90, 107, 121, 112, 177, 970, 966
See application file for complete search history.

(56) References Cited

U.S. PATENT DOCUMENTS

| | | | | |
|---|---|---|---|---|
| 2,413,669 A * | 12/1946 | Whitcombe | ................... | 411/85 |
| 2,438,044 A * | 3/1948 | Freesz | ............................. | 411/85 |
| 2,469,312 A * | 5/1949 | Poupitch | ......................... | 411/85 |
| 2,494,882 A * | 1/1950 | Kost | ................................ | 411/277 |
| 2,495,037 A * | 1/1950 | Tinnerman | ..................... | 411/112 |
| 2,542,375 A * | 2/1951 | Torresen | ......................... | 411/84 |
| 2,552,499 A * | 5/1951 | Tinnerman | ..................... | 411/112 |
| 2,605,806 A * | 8/1952 | Tinnerman | ..................... | 411/112 |
| 2,627,294 A * | 2/1953 | Bedford, Jr. | ................... | 411/173 |
| 2,649,126 A | 8/1953 | Tinnerman | | |
| 2,695,046 A * | 11/1954 | Tinnerman, III | .............. | 411/112 |
| 2,717,622 A * | 9/1955 | Flora | ............................. | 411/112 |
| 2,727,552 A * | 12/1955 | Chvesta | ........................ | 411/112 |
| 2,789,820 A * | 4/1957 | Walker | ............................. | 472/16 |
| 2,853,113 A * | 9/1958 | Balint et al. | ................... | 411/103 |
| 3,020,946 A * | 2/1962 | Mills | .............................. | 411/85 |

(Continued)

OTHER PUBLICATIONS

PCT International Search Report and PCT Written Opinion dated: Sep. 17, 2010.

*Primary Examiner* — Gary Estremsky
(74) *Attorney, Agent, or Firm* — McCarter & English, LLP

(57) ABSTRACT

A cage nut assembly is provided for retaining a nut within a cage's nut capture region defined by a base with a hole substantially in its center, two lateral truss integral with the base and perpendicular to each other, and two upwardly extending arms also integral with the base. The two upwardly extending arms form a C-shaped head at the distal end that extend over the nut capture region. Thus a nut disposed in said cage is substantially flush with the base of said cage. A multiple cage nut assembly is provided for retaining a nut within cage's plurality of nut capture regions. One such nut capture region being defined by a base with a hole substantially in its center, two lateral truss integral with the base and perpendicular to each other, and two upwardly extending arms also integral with the base. The two upwardly extending arms form a C-shaped head at the distal end that extend over the nut capture region. Thus a nut disposed in said cage is substantially flush with the base of said cage. At least one other nut capture region being defined by a base with a hole substantially in its center, two lateral truss integral with the base and perpendicular to each other, and two upwardly extending arms also integral with the base. The two upwardly extending arms form a head with a bearing surface at the distal end that extend over the nut capture region. Thus a nut disposed in said cage is substantially flush with the base of said cage.

17 Claims, 7 Drawing Sheets

U.S. PATENT DOCUMENTS

| | | | |
|---|---|---|---|
| 3,035,624 A * | 5/1962 | Jaworski | 411/112 |
| 4,488,844 A * | 12/1984 | Baubles | 411/85 |
| 5,096,350 A | 3/1992 | Peterson | |
| 5,193,643 A * | 3/1993 | McIntyre | 180/312 |
| 5,281,064 A * | 1/1994 | Zimmer | 411/85 |
| 5,624,319 A | 4/1997 | Golczyk et al. | |
| 6,146,071 A | 11/2000 | Norkus et al. | |
| 6,457,924 B1 * | 10/2002 | Wallace | 411/112 |
| 6,758,645 B2 | 7/2004 | Curley, Jr. et al. | |
| 6,997,659 B2 | 2/2006 | Vrana et al. | |
| 7,156,599 B2 | 1/2007 | Clinch et al. | |
| 2007/0243039 A1 | 10/2007 | Johnson et al. | |

\* cited by examiner

CAGE NUT ASSEMBLY

BACKGROUND

1. Technical Field

The present disclosure is directed generally to a cage nut assembly and, more particularly, to a cage nut assembly for use with rack units.

2. Background Art

Cage nut assemblies are used in a variety of settings to provide a means for holding a nut in place while securing a screw. The object of the cage nut assembly is to ensure that the nut remains secure to the object it is being placed on while the screw is being attached; thereby ensuring that the screw and nut are securely fastened. U.S. Pat. Nos. 5,096,350, 5,624,319, 6,146,071, 6,758,645 and 7,156,599 disclose various prior art cage nut assemblies. One area in which it is vital to ensure screws and nuts are securely fastened is in computer rack systems.

Computer rack systems are designed to store multiple components and generally have removable rack mountable equipment that must be screwed into the computer rack and can be attached at different places to maximize the usage of space within the computer rack. To ensure that there is adequate spacing for different rack mountable equipment, the racks typically have a plurality of holes for the screws necessary to install rack mountable equipment. The industry has adopted as a standard the "rack unit," a distance of 1.75 inches. A rack unit by convention has three screw holes within each rack unit, equidistant apart.

The versatility of rack mountable equipment needs can lead to lengthy installation times for computer racks. This installation time is influenced by the number of rack mountable equipment being installed and the varying size of the objects being installed on the rack. The adoption of rack units as a standard distance between rack mountable equipment units has reduced installation times by allowing for a variety of well defined spacing between rack mountable equipment.

Despite this adoption, a need remains to further reduce the installation time for computer rack systems and to facilitate the ease/alignment associated therewith. These and other needs are satisfied by the cage nut disclosed herein.

SUMMARY

In accordance with embodiments of the present disclosure, a cage nut assembly is provided for retaining a nut within a cage's nut capture region. Exemplary nut capture regions according to the present disclosure are defined by a base with a hole substantially in its center, two lateral trusses integral with the base and substantially perpendicular to each other, and two upwardly extending arms also integral with the base. The two upwardly extending arms form a C-shaped head at the distal end that extend over the nut capture region. Thus, a nut disposed in the cage is substantially flush with the base of the cage.

In accordance with embodiments of the present disclosure, a multiple cage nut assembly is provided for retaining a plurality of nuts within the cage in a plurality of nut capture regions. Each nut capture region is generally defined by a base with a hole substantially in its center, two lateral trusses integral with the base and substantially perpendicular to each other, and two upwardly extending arms also integral with the base. At least one of the set of two upwardly extending arms form C-shaped heads at the distal end of the upwardly extending arms that extend over the nut capture region. Thus, a nut disposed in this cage is substantially flush with the base of said cage. The two upwardly extending arms of the other nut capture regions form a head with a bearing surface at the distal end that extend over the nut capture region. Thus, a nut disposed in this cage is also substantially flush with the base of said cage. Of note, the spacing of nuts within a multiple cage nut assembly may be advantageously established so as to correspond to the spacing of mounting apertures on a rack assembly, thereby facilitating the simultaneous alignment/mounting of a multiplicity of elements.

In accordance with embodiments of the present disclosure, the upwardly extending arms with C-shaped heads are compressed towards each other to allow them to capture the sidewall of a nut. Once positioned relative to a mounting location, the cage nut assembly advantageously holds the nut in place as a screw is threaded through the nut and an associated mounting aperture. The nut cage of the present invention may be formed by stamping a substantially flat piece of a metal or metal alloy and bending the stamped portions to form the different components.

Additional features, functions and benefits of the disclosed cage nut assembly will be apparent from the detailed description which follows, particularly when read in conjunction with the appended figures.

BRIEF DESCRIPTION OF FIGURES

To assist those of skill in the art in making and using the disclosed cage nut assembly, wherein.

DESCRIPTION OF EXEMPLARY EMBODIMENT(S)

Figure 1:
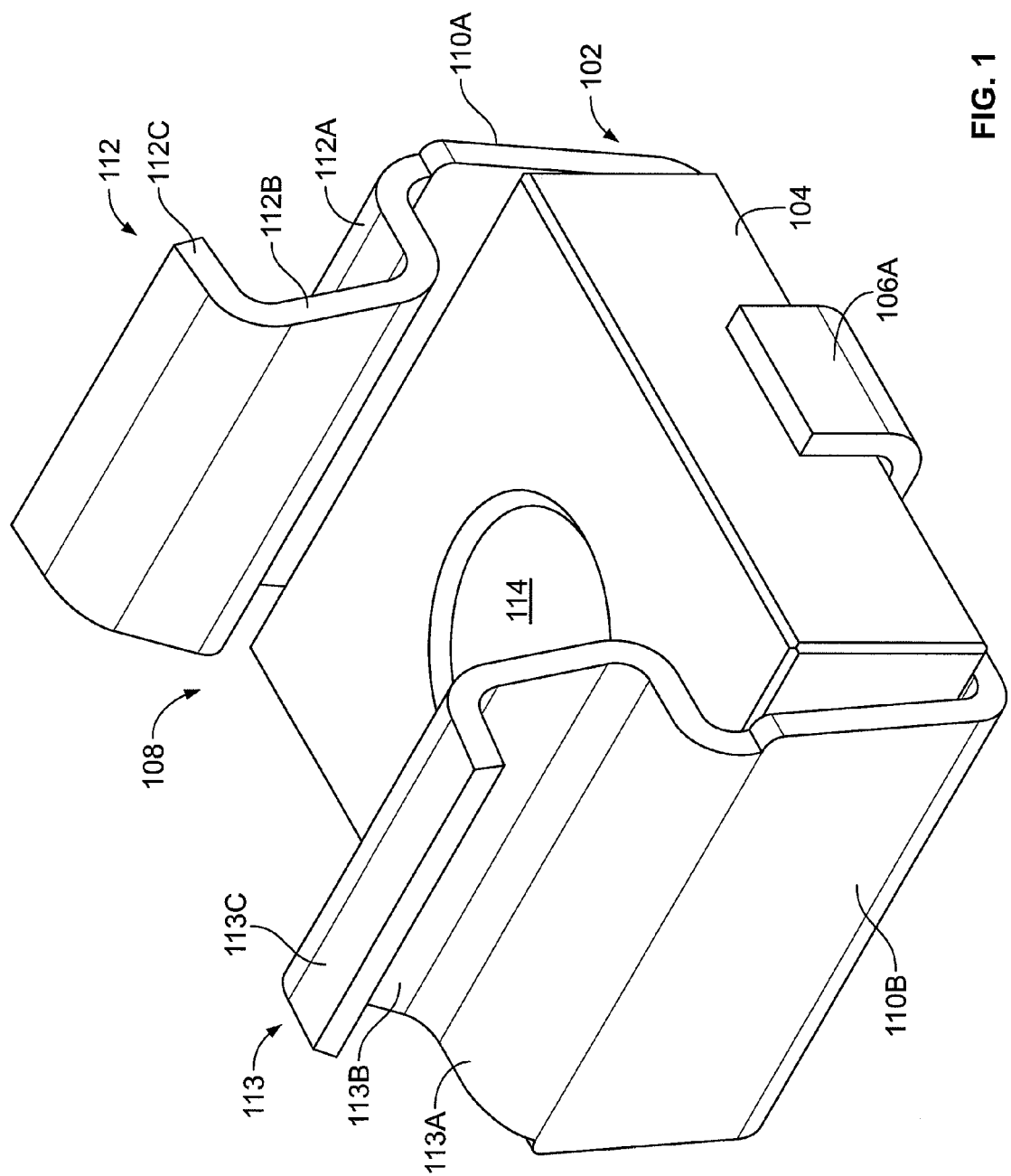
FIG. 1 is a perspective side view of an exemplary single cage nut assembly in accordance with the present disclosure.

In accordance with an exemplary embodiment of the present disclosure, a cage nut assembly is provided for retaining a nut within a cage's nut capture region. The nut capture regions may be defined by a base with a hole substantially in its center, two lateral trusses integral with the base and substantially perpendicular to each other, and two upwardly extending arms also integral with the base. The two upwardly extending arms form a C-shaped head at the distal end that extend over the nut capture region. Thus, a nut disposed in said cage is substantially flush with the base of said cage.

With reference to FIGS. 1-4, an instance of a cage nut assembly is depicted in accordance with the present disclosure in the form of a cage nut assembly 100. The cage nut assembly 100 includes a cage 102 and nut 104. The cage 102 includes a base 120, two lateral trusses 106A and 106B, and two upwardly extending arms 110A and 110B, that form a nut capture region 108 that retains nut 104 substantially flush with base 120. The cage 102 can be made of any metal or metal alloy capable of accommodating requisite metal forming operations and substantially maintaining its shape thereafter. Note that in an alternative embodiment, lateral trusses 106A and 106B may be replaced with a plurality of horizontally smaller lateral trusses as compared to those depicted in FIGS. 1-4.

The upwardly extending arms 110A and 110B advantageously form C-shaped heads 112 and 113 that each respectively extends over the top of the nut 104 and secures nut 104 within the nut capture region 108 of cage nut assembly 100. C-shaped heads 112 and 113 define bearing surfaces 112A and 113A, respectively, that bear against the top surface of nut 104 and hold nut 104 within nut capture region 108. In addition, C-shaped heads 112 and 113 also define vertical extensions 112B and 113B, respectively, which extend vertically upward from bearing surfaces 112A and 113A, respectively. Still further, C-shaped heads 112 and 113 define capture arms 112C and 113C, respectively, which extend horizontally from the upper end of vertical extensions 112B and 113B, respectively. In the present embodiment, nut 104 is substantially rectangular and has a threaded hole 114 substantially in its center. One skilled in the art will understand that this description is not necessarily limited to rectangular nuts.

Figure 2:
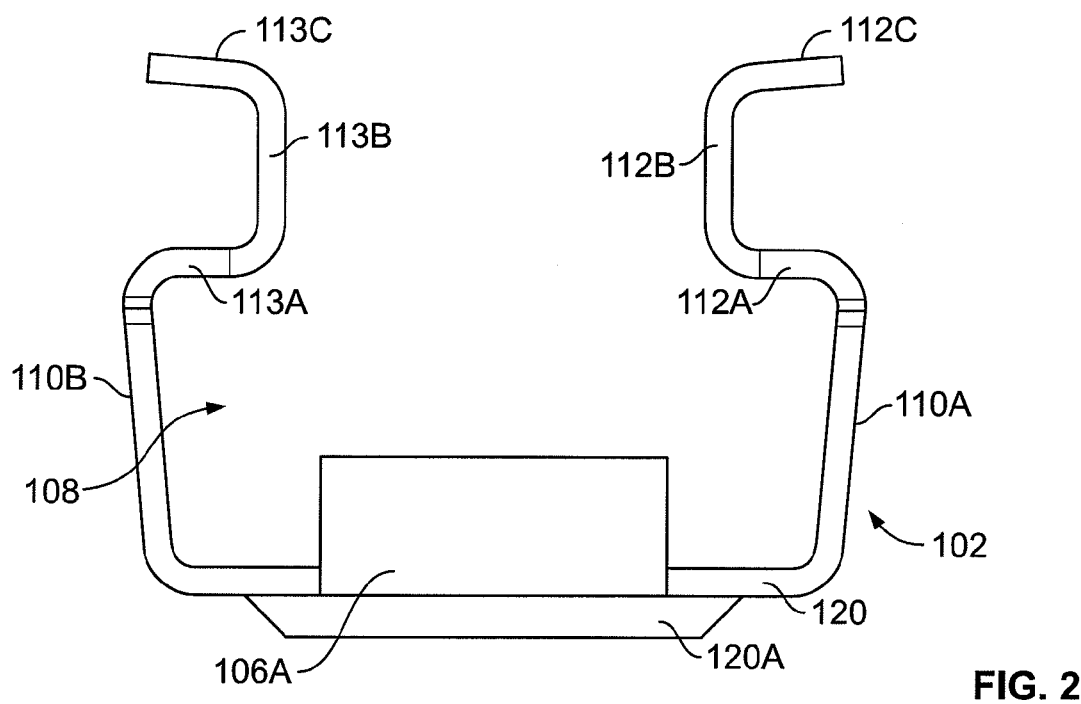
FIG. 2 is a side view of the exemplary single cage nut assembly of FIG. 1.
Figure 3:
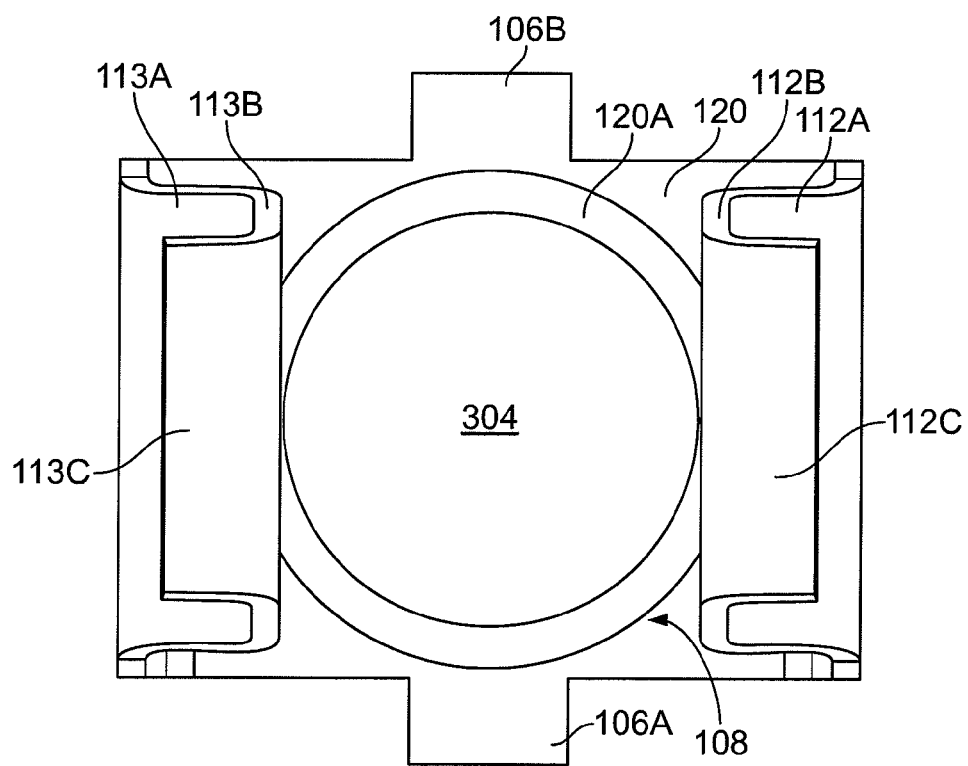
FIG. 3 is a top view of the exemplary single cage nut assembly of FIG. 1.

With particular reference to FIG. 2, the cage 102 is depicted in greater detail in a side profile. Upwardly extending arms 110A and 110B can be compressed such that C-shaped heads 112A and 112B, respectively, move towards each other from the perspective of FIG. 2. A top view of cage 102 is further provided in FIG. 3 showing lateral truss 106B and hole 304 not visible in prior FIGS. 1 and 2. Referring to both FIGS. 2 and 3, base 120 includes substantially annular surface 120A which protrudes from base 120 to define hole 304.

The nut cage 102 may be formed by stamping a substantially flat piece of a metal or metal alloy and bending the stamped portions to form the different components. Annular surface 120A is a remnant of the construction process and one skilled in the art will understand that annular surface 120A may be sheared off to leave a substantially flat base 120 from the perspective of FIG. 2.

Figure 4:
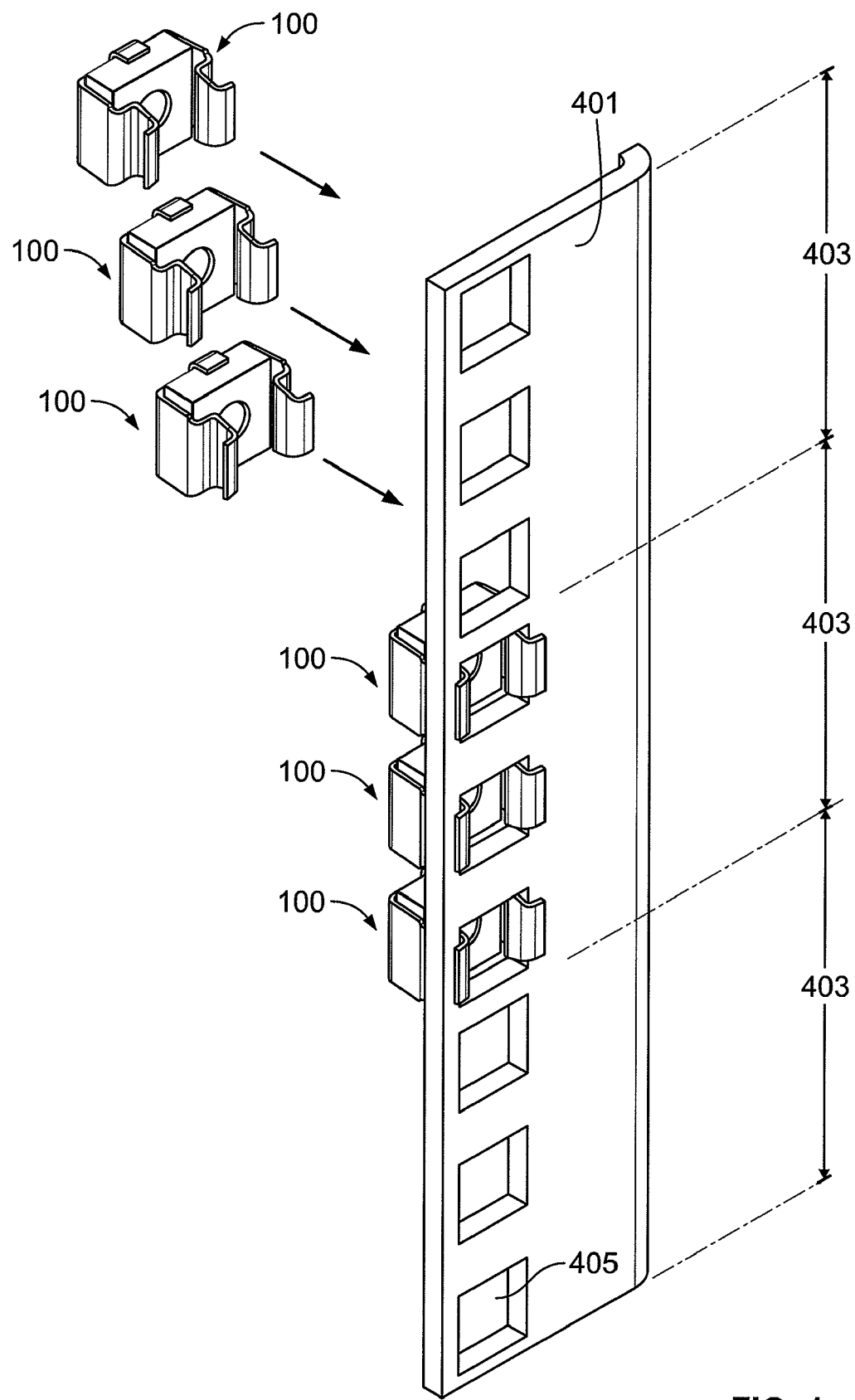
FIG. 4 is a schematic plan view of single cage nuts and a portion of a computer rack illustrating the single cage nut snapped into the computer rack and the standard rack unit distance in accordance with the present disclosure.
Figure 5:
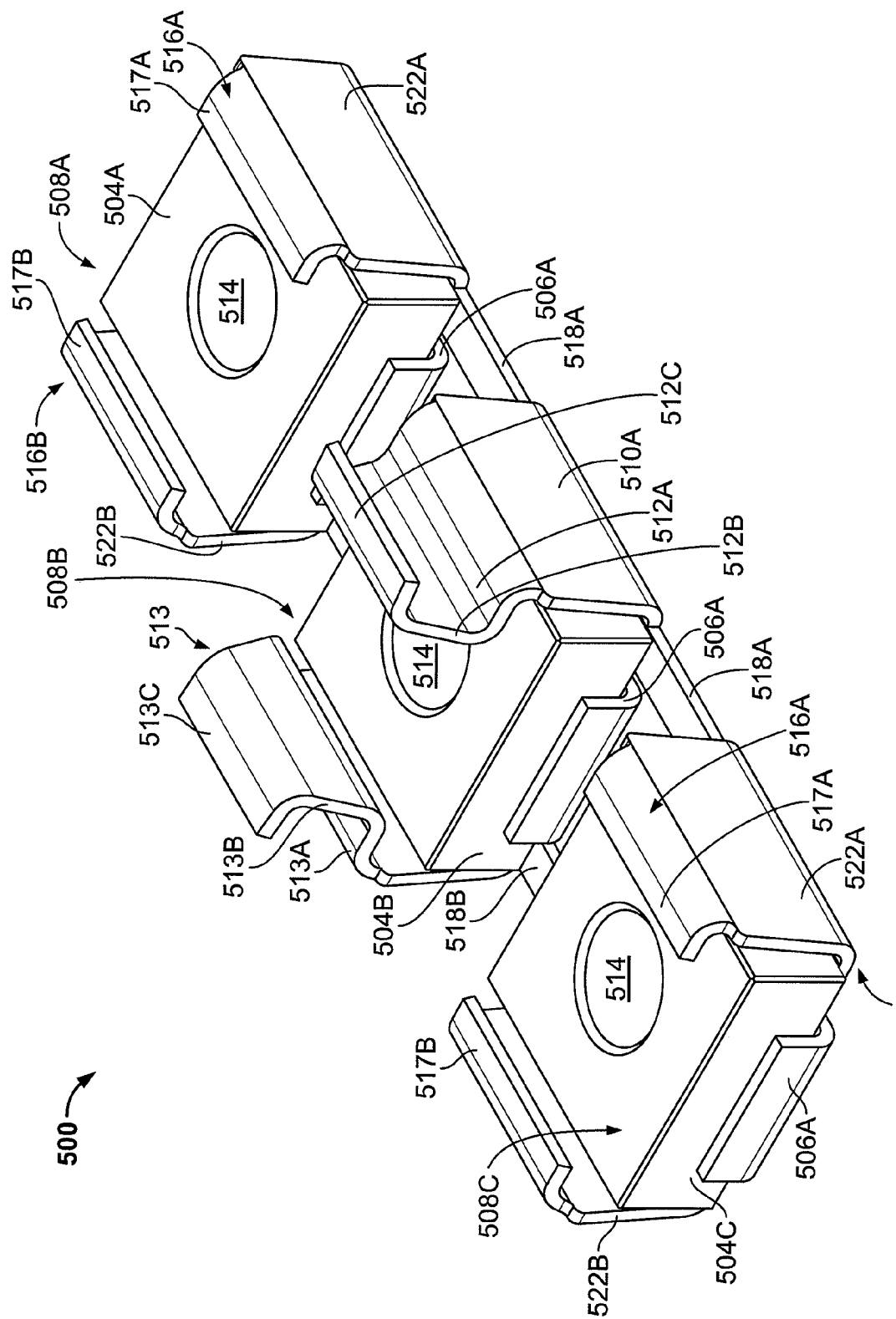
FIG. 5 is a perspective side view of an exemplary triple cage nut assembly in accordance with an alternative embodiment of the present disclosure.

FIG. 4 depicts the cage nut assembly 100 and a portion of the lateral side of a computer rack system 401 showing a standard rack unit 403, with three substantially square holes 405 per rack unit 403. Cage nut assemblies 402, 404 and 406 have been compressed to allow them to fit into holes 405, such that the C-shaped heads 112 and 113 hook onto the lateral walls that form hole 405. Specifically, vertical surfaces 112B and 113B, respectively, and capture arms 112C and 113C, respectively, engage the sidewalls of hole 405. Note that the ease with which cage nut assembly 100 may be properly aligned and secured relative to computer rack system 401 advantageously reduces the installation/assembly time for computer racks and generally facilitates such installation/assembly.

Turning now to FIGS. 5-8, an alternate cage assembly is depicted in accordance with the present disclosure. In the exemplary embodiment of FIG. 5, cage assembly 500 includes cage 502 capable of housing three nuts 504A, 504B, 504C substantially flush with base 520, thereby defining three respective nut capture regions 508A, 508B and 508C, respectively. The portion of cage 502 that defines capture nut region 508B is essentially the same as the cage 102 described above, and therefore like reference numerals preceded by the numeral "5" instead of the numeral "1" are used to indicate like elements.

Base 520 is essentially the same as base 120 and further includes struts 518A and 518B that extend from the portion of base 520 that forms nut capture region 508A to the portion of base 520 that forms nut capture region 508B. A second set of struts 518A and 518B are provided that extend from the portion of base 520 that forms nut capture region 508B to the portion of base 520 that forms nut capture region 508C. Note that in an alternative embodiment, the lateral trusses 506A and 506B may be replaced with a plurality of horizontally smaller lateral trusses and thus struts 518A and 518B can be replaced with one strut substantially in the center of the cage 502. Nut capture region 508A and 508C are defined by lateral truss 506A and 506B and upwardly extending arm 522A and 522B, that function to capture nut 504. The upwardly extending arms 522A and 522B advantageously form head 516A and 516B, respectively, which include bearing surface 517A that extends horizontally over the top of nut 504 and secures nut 504 within the cage nut assembly 500. Nut 504 is substantially rectangular and has a threaded hole 514 substantially in its center. One skilled in the art will understand that this description is not necessarily limited to rectangular nuts. One skilled in the art will further understand that cage 502 may be formed through joining separate struts 518A and 518B to the portion of base 520 that forms each respective nut capture region or through the stamping process described above.

Figure 6:
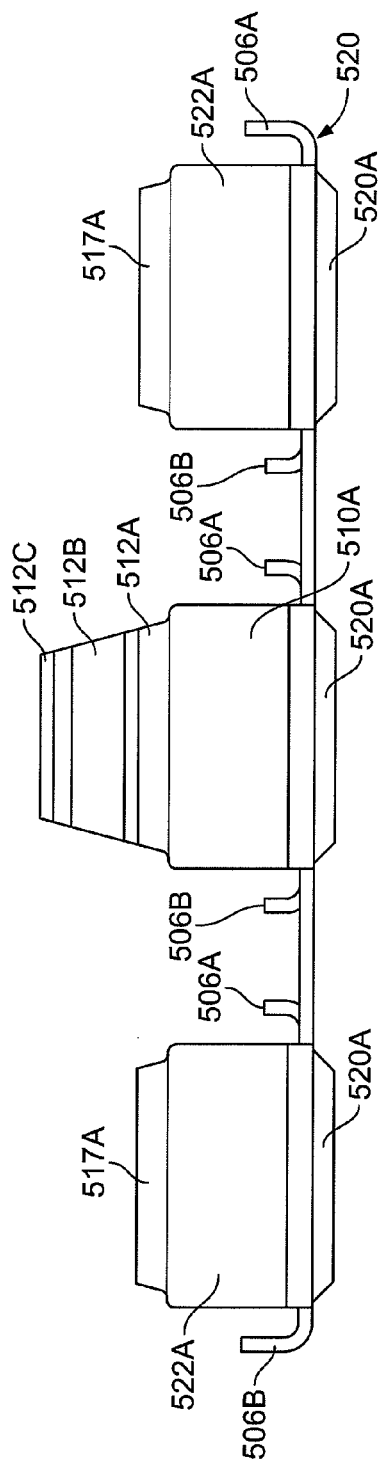
FIG. 6 is a side view of the exemplary triple cage nut assembly in accordance with FIG. 5.
Figure 7:
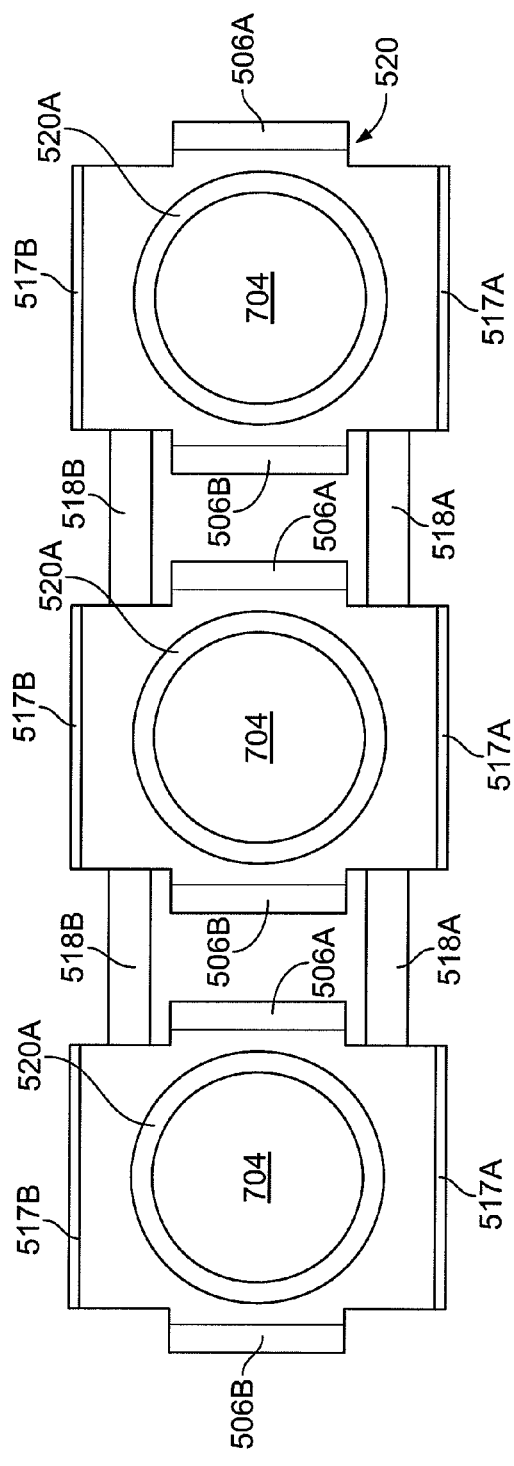
FIG. 7 is a bottom view of the exemplary triple cage nut assembly in accordance with FIG. 5.
Figure 8:
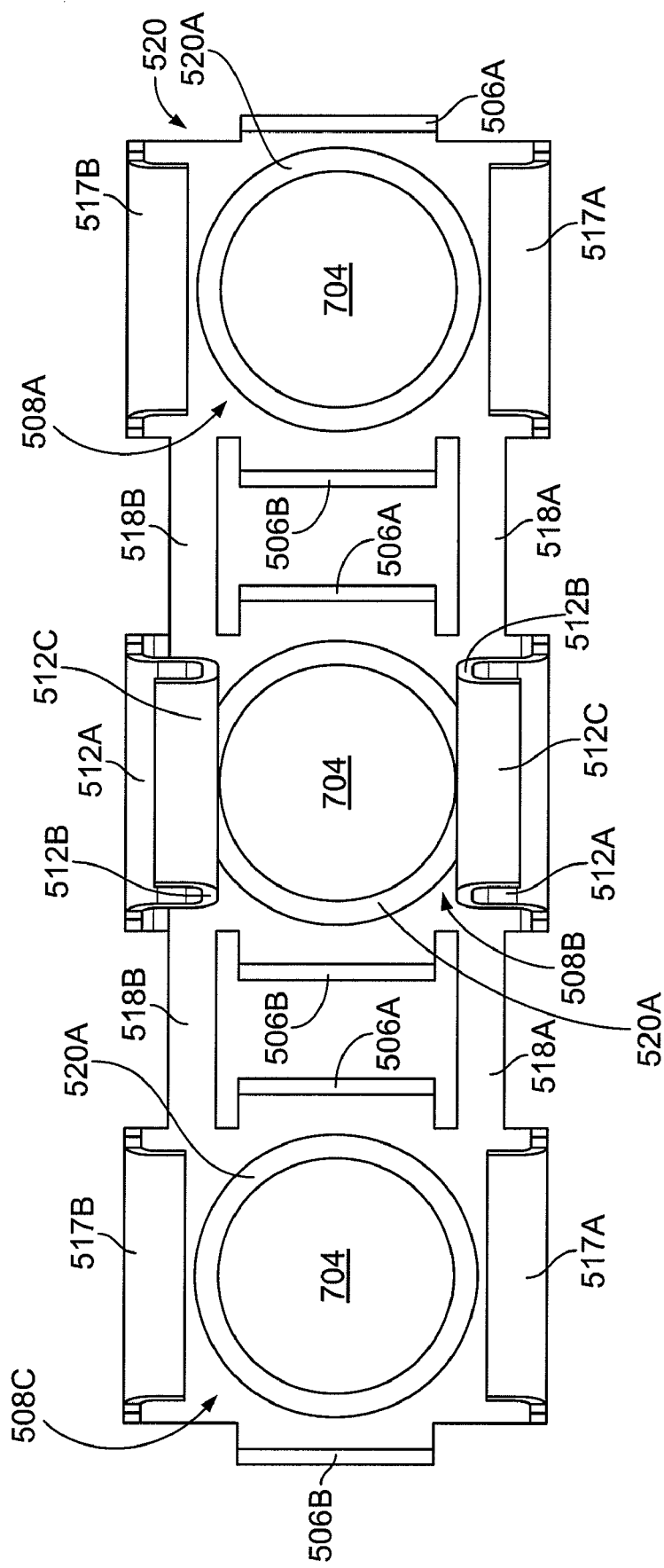
FIG. 8 is a top view of the exemplary triple cage nut assembly in accordance with FIG. 5.

With respect to FIG. 6, the cage 502 is depicted in greater detail in a side profile. A bottom view of cage 502 is further provided in FIG. 7 showing lateral truss 506B, base 520 and hole 704 not visible in prior FIGS. 5 and 6. A top view of cage 502 is further provided in FIG. 8 showing heads 510A, 510B, 516A and 516B not visible in prior FIG. 7. Upwardly extending arms 510A and 510B can be compressed such that C-shaped head 512 and 513, respectively, move towards each other from the perspective of FIG. 8.

Figure 9:
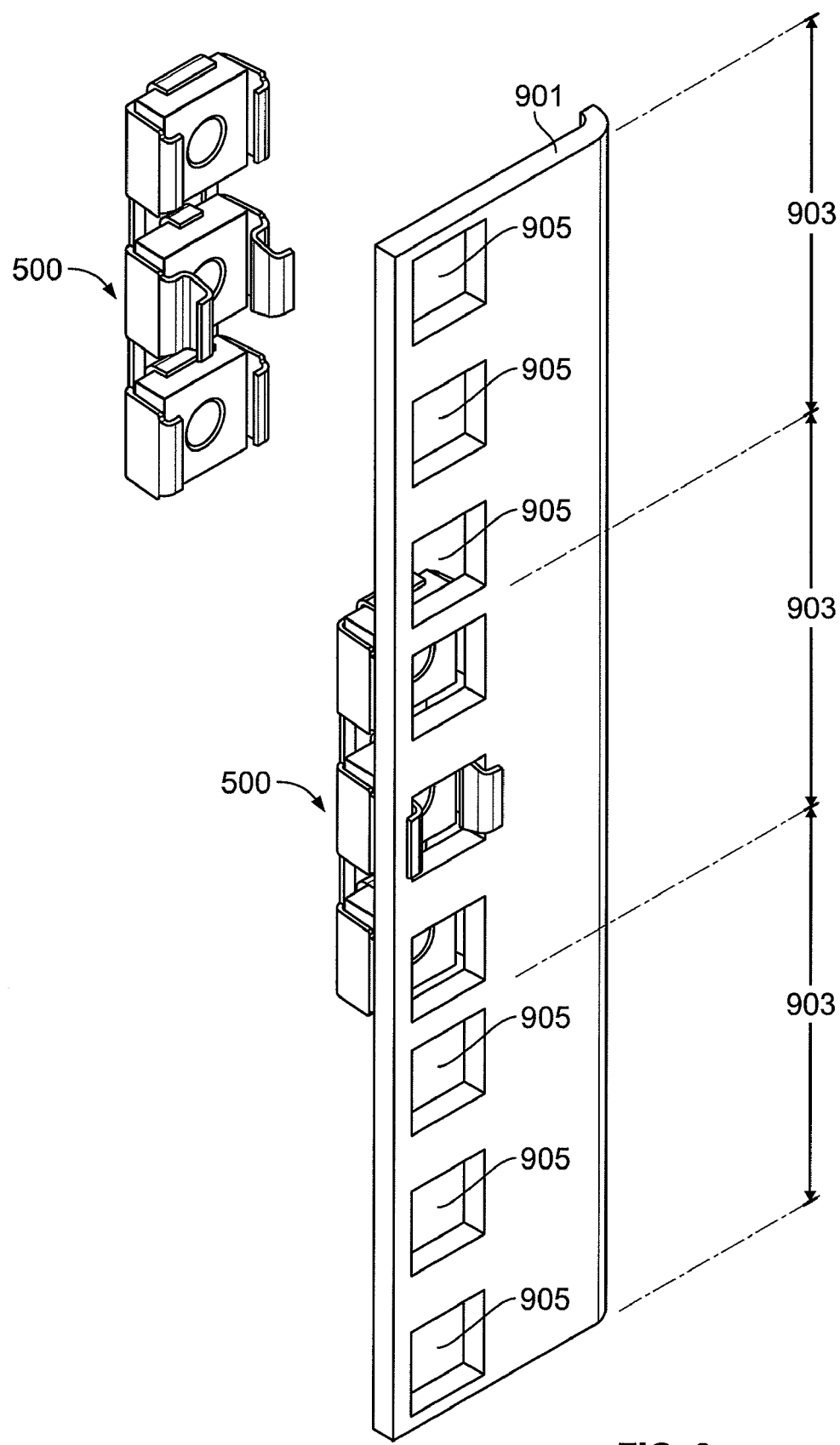
FIG. 9 is a schematic view of triple cage nuts and a portion of a computer rack illustrating a triple cage nut assembly snapped into the computer rack in accordance with the present disclosure.

FIG. 9 depicts the cage nut assembly 500 and a portion of the lateral side of a computer rack system 901 showing a standard rack unit 903, with three substantially square holes 905 per rack unit 903. Cage nut assembly 902 has been compressed such that the C-shaped heads 512A and 512B hook onto the lateral walls that form hole 905. Note that this embodiment of the cage nut assembly 500 advantageously further reduces installation time in computer racks systems by two thirds over the cage nut 100 of FIG. 1.

Although the present disclosure has been described with reference to exemplary embodiments and implementations, it is to be understood that the present disclosure is neither limited by nor restricted to such exemplary embodiments and/or implementations. Rather, the present disclosure is susceptible to various modifications, enhancements and variations without departing from the spirit or scope of the present disclosure. Indeed, the present disclosure expressly encompasses such modifications, enhancements and variations as will be readily apparent to persons skilled in the art from the disclosure herein contained.

The invention claimed is:
1. A cage nut assembly comprising:
  a. a first nut capture region adapted to retain an object, said first nut capture region defined by:
    i. a first base, wherein said base comprises a perimeter and a hole disposed substantially in the center of said first base;

ii. a first lateral truss integral with the perimeter of said first base;

iii. a second lateral truss integral with the perimeter of said first base and disposed substantially opposite relative to said first lateral truss;

iv. a first pair of upwardly extending arms, further comprising:

1. a first upwardly extending arm integral with the perimeter of said first base, disposed substantially perpendicular to said first and second lateral truss; and 2. a second upwardly extending arm integral with the perimeter of said first base, disposed substantially perpendicular to said first and second lateral truss and opposite said first upwardly extending arm;

b. at least one second nut capture region adapted to retain an object, said second nut capture region defined by:

i. a second base, wherein said second base comprises a perimeter and a hole disposed substantially in the center of said second base;

ii. a third lateral truss integral with the perimeter of said second base;

iii. a fourth lateral truss integral with the perimeter of said second base and disposed substantially opposite relative to said third lateral truss;

iv. a second pair of upwardly extending arms, further comprising:

1. a third upwardly extending arm integral with the perimeter of said second base, disposed substantially perpendicular to said third and fourth lateral truss; and 2. a fourth upwardly extending arm integral with the perimeter of said base, disposed substantially perpendicular to said third and fourth lateral truss and substantially opposite said third upwardly extending arm;

c. wherein the first base and second base are defined by a single, continuous structure and said first nut capture region further comprises a pair of C-shaped members extending at least in part above a portion of said first nut capture region and from said first pair of upwardly extending arms, the pair of C-shaped members comprising:

i. a first C-shaped member having a first bearing surface extending generally perpendicularly from the first upwardly extending arm, a first vertical extent extending generally perpendicularly from the first bearing surface, and a first capture arm extending generally perpendicularly from an upper end of the first vertical extent; and ii. a second C-shaped member defined by a second bearing surface extending generally perpendicularly from the second upwardly extending arm, a second vertical extent extending generally perpendicularly from the second bearing surface, and a second capture arm extending generally perpendicularly from an upper end of the second vertical extent.

2. The cage nut assembly of claim 1, wherein a third bearing surface extends generally perpendicularly from said third upwardly extending arm and a fourth bearing surface extends generally perpendicularly from said fourth upwardly extending arm of said second nut capture region.

3. The cage nut assembly of claim 1, wherein said base is substantially square.

4. The cage nut assembly of claim 1, wherein said first nut capture region is connected to a plurality of nut capture regions.

5. A cage nut assembly comprising:
a. a nut having a threaded bore, wherein said threaded bore has a diameter; and
b. the cage assembly of claim 1.

6. The cage nut assembly of claim 5, wherein said first, second, third and fourth integral truss extend upwardly a length necessary to retain said nut.

7. The cage nut assembly of claim 5, wherein the holes of said base has a diameter greater than or equal to the diameter of said threaded bore.

8. The cage nut assembly of claim 1, wherein the third pair of C-shaped members compress and hook onto lateral walls of a hole of a receiving member.

9. A cage nut assembly comprising:
a first nut capture region defined by (i) a first base portion, (ii) a first pair of opposing upwardly extending arms extending from the first base portion, and (iii) a C-shaped member extending from each of the upwardly extending arms of the first pair and extending at least in part over the first base portion of the first nut capture region;
a second nut capture region operatively coupled to the first nut capture region, the second nut capture region defined by (i) a second base portion, (ii) a second pair of opposing upwardly extending arms extending from the second base portion, and (iii) a bearing surface extending from each of the upwardly extending arms of the second pair and extending at least in part over the second base portion of the second nut capture region; and
an intermediate base portion integrally formed with, and extending between, the first base portion and the second base portion,
wherein the first base portion and the second base portion are spaced apart by the intermediate base portion and the first base portion, the second base portion, and the intermediate base portion form a single, continuous structure.

10. The cage nut assembly of claim 9, wherein the intermediate base portion comprises a first strut extending between the first base portion and the second base portion, the first base portion and the second base portion being spaced apart by the strut.

11. The cage nut assembly of claim 10, wherein the intermediate base portion comprises a second strut extending between the first base portion and the second base portion, the first and second strut being spaced apart and parallel to each other.

12. The cage nut assembly of claim 9, wherein the C-shaped member extending from a first one of the upwardly extending arms of the first pair comprises:
a first surface extending generally perpendicularly from the first one of the upwardly extending arms;
a vertical extent extending generally perpendicularly from the first bearing surface, and
a capture arm extending generally perpendicularly from an upper end of the first vertical extent.

13. The cage nut assembly of claim 9, further comprising a third nut capture region operatively coupled to the first nut capture region.

14. The cage nut assembly of claim 13, wherein the third nut capture region is operatively coupled to the first nut capture region by another intermediate base portion integrally formed with, and extending between, a third base portion associated with the of the third nut capture region and the first base portion associated with the first nut capture region.

15. The cage nut assembly of claim 13, wherein the first, second, and third nut capture regions are arranged linearly.

16. The cage nut assembly of claim 9, wherein each bearing surface of the second nut capture region have a first end integrally formed with and extending from one of the upwardly extending arms of the second pair and a second free terminus end.

17. The cage nut assembly of claim 9, wherein the C-shaped member extending from each of the upwardly extending arms is configured to hook on to a rack system to mount the first and second nut capture regions with respect to the rack system.

* * * * *